United States Patent [19]

Hayes

[11] Patent Number: 5,322,549
[45] Date of Patent: Jun. 21, 1994

[54] POLYIMIDES AND GAS SEPARATION MEMBRANES PREPARED THEREFROM

[75] Inventor: Richard A. Hayes, Houston, Tex.

[73] Assignee: E. I. Du Pont de Nemours and Company, Wilmington, Del.

[21] Appl. No.: 71,081

[22] Filed: Jun. 4, 1993

[51] Int. Cl.⁵ .................. B01D 53/22; B01D 71/64
[52] U.S. Cl. .................................. 95/45; 95/54; 96/4; 210/500.39
[58] Field of Search .................. 96/4, 7-14; 210/500.39; 95/45, 47, 49, 51, 54, 55

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 210/23 |
| 3,899,309 | 8/1975 | Hoehn et al. | 29/16 |
| 4,240,914 | 12/1980 | Iwama et al. | 210/500.2 |
| 4,307,135 | 12/1981 | Fox | 427/244 |
| 4,358,378 | 11/1982 | Iwama et al. | 210/500.2 |
| 4,378,324 | 3/1983 | Makino et al. | 264/41 |
| 4,385,084 | 5/1983 | Iwama et al. | 427/244 |
| 4,410,568 | 10/1983 | Iwama et al. | 427/244 |
| 4,460,526 | 7/1984 | Makino et al. | 264/41 |
| 4,485,056 | 11/1984 | Makino et al. | 264/41 |
| 4,512,893 | 4/1985 | Makino et al. | 210/500.2 |
| 4,532,041 | 7/1985 | Shuey et al. | 210/500.2 |
| 4,690,873 | 9/1987 | Makino et al. | 428/473.5 |
| 4,717,393 | 1/1988 | Hayes | 210/500.39 X |
| 4,717,394 | 1/1988 | Hayes | 210/500.39 X |
| 4,983,191 | 1/1991 | Ekiner et al. | 210/500.39 X |
| 4,988,371 | 1/1991 | Jeanes et al. | 96/10 X |
| 4,997,462 | 3/1991 | Nakatani et al. | 210/500.39 X |
| 5,015,270 | 5/1991 | Ekiner et al. | 96/10 X |
| 5,232,472 | 8/1993 | Simmons et al. | 96/14 |

FOREIGN PATENT DOCUMENTS

| | | | |
|---|---|---|---|
| 0413415 | 2/1991 | European Pat. Off. | 210/500.39 |
| 59-209611 | 11/1984 | Japan | 210/500.39 |

Primary Examiner—Robert Spitzer
Attorney, Agent, or Firm—Cary A. Levitt

[57] ABSTRACT

A polyimide, and a gas separation membrane prepared therefrom, containing repeating units derived from 5(2,5-dioxo-tetrahydrofuryl)-3-methyl-3,3-cyclohexane-1,2-dicarboxylic anhydride is disclosed.

10 Claims, No Drawings

POLYIMIDES AND GAS SEPARATION MEMBRANES PREPARED THEREFROM

BACKGROUND

1. Field of the Invention

The present invention relates to polyimides incorporating repeating units, derived from the dianhydride 5-(2,5-dioxo-tetrahydrofuryl)-3-methyl-3-cyclohexane-1,2-dicarboxylic anhydride and various aromatic diamines.

2. Prior Art

U.S. Pat. Nos. 4,240,914; 4,358,378; 4,385,084 and Pat. No. 4,410,568 disclose asymmetric polyimide gas separation membranes prepared from an aliphatic polyimide material. Said aliphatic polyimide material is compositionally different from that described herein.

U.S. Pat. No. Re 30,351; U.S. Pat. Nos. 3,822,202 and 3,899,309 disclose gas separation membrane materials comprising certain semirigid aromatic polyimides, polyamides and polyesters.

U.S. Pat. No. 4,307,135 discloses the preparation of an asymmetric polyimide membrane from a soluble polyimide.

U.S. Pat. Nos. 4,378,324; 4,460,526; 4,485,056 and 4,512,893 disclose a process for preparing asymmetric polyimide membranes.

U.S. Pat. No. 4,690,873 discloses an aromatic polyimide gas separation membrane material.

SUMMARY OF THE INVENTION

The present invention relates to novel polyimide gas separation membranes prepared therefrom, and the separation of at least one gas from a mixture of gases using such membranes. The polyimides are polymers or copolymers derived from dianhydrides and aromatic diamines wherein at least one repeating unit contains 5-(2,5dioxo-tetrahydrofuryl)-3-methyl-3,3-cyclohexane-1,2-dicarboxylic anhydride. Preferably, at least about 10 mole percent and most preferably at least about 50 mole percent of the dianhydride residues are derived from 5-(2,5dioxo-tetrahydrofuryl)-3-methyl-3,3-cyclohexane-1,2-dicarboxylic anhydride, which has the following structural formula:

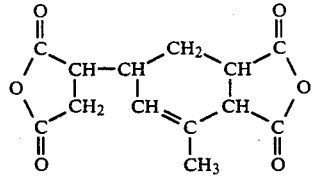

These polyimides exhibit superior permselectivity with respect to several gaseous mixtures and particularly with respect to the mixture of nitrogen and oxygen as found in the atmosphere.

DETAILED DESCRIPTION OF THE INVENTION

The separation of one or more gases from a complex multicomponent mixture of gases has been found to be necessary in a large number of industries. Such separations currently are undertaken commercially by such processes as cryogenics, pressure swing adsorption and membrane separations. In certain of the separations, membrane separations have been found to be economically more viable than other processes. In a gas separation process, one side of the membrane is contacted with a multicomponent gas mixture and certain of the gases of said mixture permeate through the membrane faster than the other gases. Gas separation membranes are semipermeable. They allow for some gases to permeate through them while serving as a barrier to other gases in a relative sense.

The present invention relates to the discovery that gas separation membranes made from polyimides which compositionally incorporate 5-(2,5-dioxo-tetrahydrofuryl)-3-methyl-3-cyclohexane-1,2-dicarboxylic anhydride, hereinafter DTMCDA (which is commercially available as EPICLON B4400, a commercial product of Dainippon Ink & Chemicals, Inc.) possess an excellent balance of gas permeation rates and selectivities of one gas over the other gases in a multicomponent gas mixture. The high productivity of these membranes is believed to be due to the optimization of the molecular free volume in the polymer structure resulting from the incorporation of DTMCDA residues in the polyimide chain.

Generally, an inverse relationship between the gas permeation rate (flux) and the selectivity of said gas over other gases in a multicomponent gas mixture has been exhibited within polymer classes, such as polyimides. Because of this, prior art polyimide gas separation membranes tend to exhibit either high gas permeation rates at the sacrifice of high gas selectivities or high gas selectivities at the sacrifice of high gas permeation rates. It is highly desirable for polyimide gas separation materials to exhibit high gas selectivities while maintaining high gas permeation rates. For example, in the separation of oxygen from nitrogen or air, oxygen generally permeates the membrane more readily. Therefore, it is desirable to increase the membrane's selectivity toward oxygen while maintaining high gas permeation rates.

The present invention provides high productivity polyimide gas separation materials which range from high selectivity to high gas permeation rates, depending on the particular polymeric or copolymeric composition used. The polyimide materials of the present invention incorporate at least one and preferably at least 10% (molar), more preferably 25% (molar) most preferably 50% (molar), DTMCDA residues in the polyimide backbone chain. The balance of the dianhydride component of said polyimide materials may constitute either aromatic or aliphatic dianhydrides. Suitable aromatic dianhydrides may be, for example, 3,3',4,4'-benzophenonetetracarboxylic acid dianhydride, 1,2,4,5-benzenetetracarboxylic acid dianhydride, 3,3',4,4'-biphenyltetracarboxylic acid dianhydride, 5,5'-[2,2,2-trifluoro-1-(trifluoromethyl) ethylidene]-bis-1,3-isobenzofurandione, or mixtures therein. Suitable aliphatic dianhydride may include, for example, 1,2,3,4-cyclopentanetetracarboxylic acid dianhydride. These examples should not be considered limiting. Virtually any dianhydride may be used in conjunction with DTMCDA. There are no limitations on the diamine component. As one skilled in the art may appreciate, one polyimide gas separation material of the present invention can be tailored over a wide range of gas separations through the choice of dianhydride and diamine components.

The preferred polyimides of the present invention have the following structural formula:

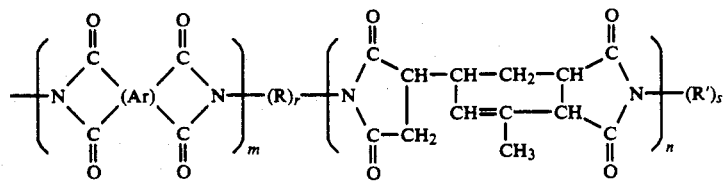
where \Ar/ is a radical selected from 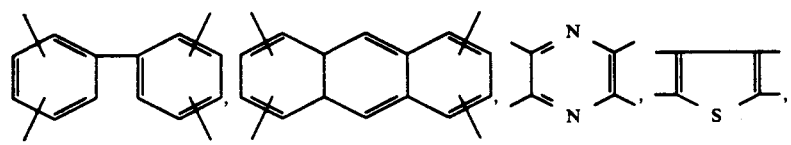
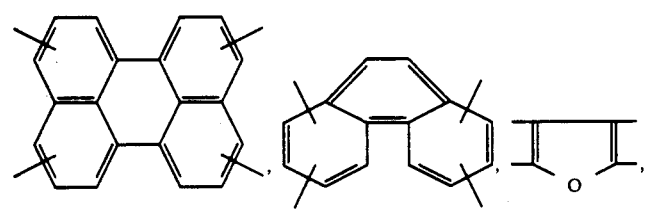
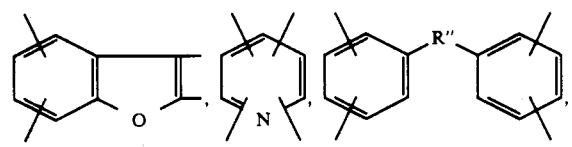
or mixtures thereof, where —R″ is an alkylene group having 1-3 carbon atoms,
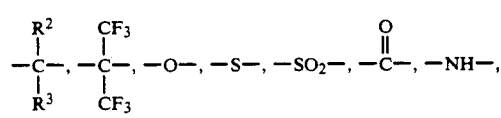
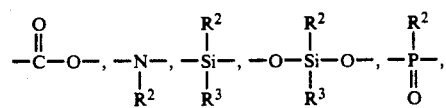
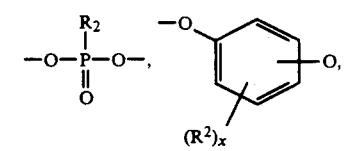
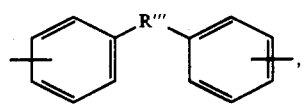
or mixtures thereof, where $R^2$ and $R^3$ are independently alkyl and aryl groups, x is an integer from 0 to 4 and —R‴ is
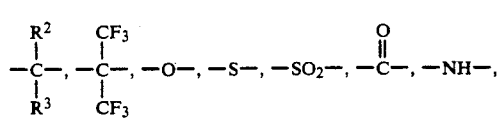
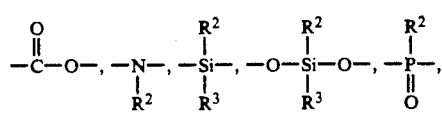
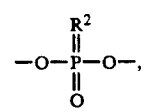
or mixtures thereof, where $R^2$ and $R^3$ have the meaning defined above.
R and R′ are independently
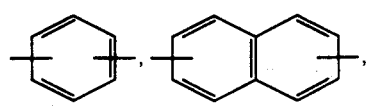

-continued

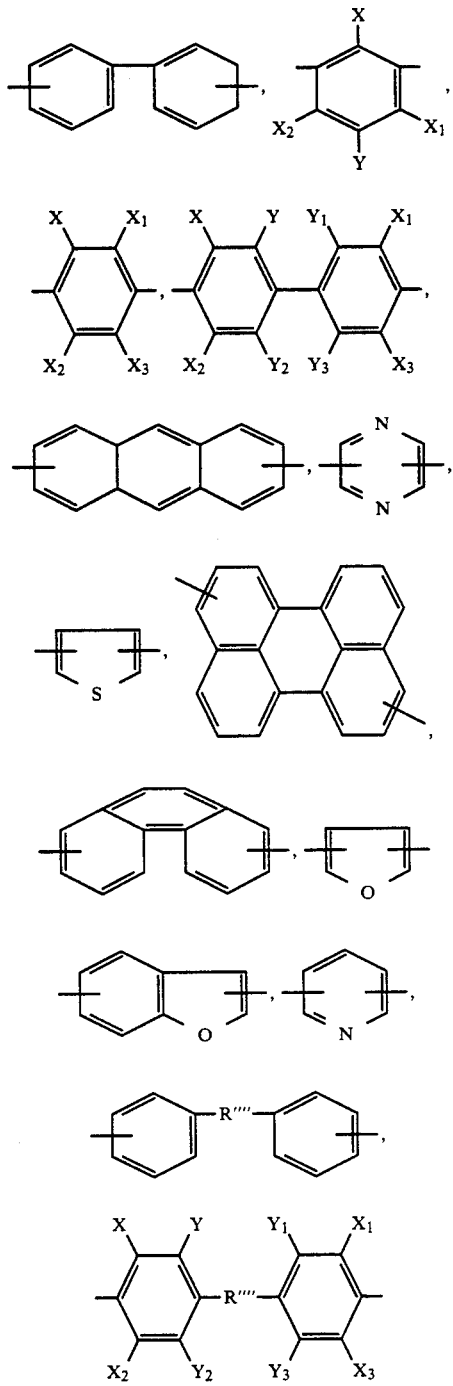

or mixtures thereof where R'''' is

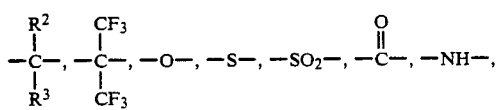

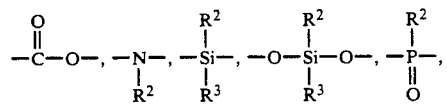

-continued

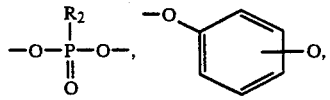

or mixtures thereof; where —X,—X$_1$, —X$_2$ and —X$_3$ independently are alkyl groups containing 1 to 6 carbon atoms and —Y,—Y$_1$—Y$_2$ and —Y$_3$ independently are —X or —H.

The polymer preferably has an inherent viscosity of at least 0.1 as measured at 30° C. on an 0.5% by weight solution in concentrated sulfuric acid. In said formula r and s=100 mole percent of the diamine residues present, n=preferably at least 10 mole percent and more preferably at least 25 mole percent and most preferably at least 50 mole percent of m+n, and m+n=100 mole percent of the dianhydride residues present.

As preferred examples, some of the fully cyclized polyimides of this invention are soluble in ordinary organic solvents. This is a great advantage for the ease of fabrication of industrially useful membranes. Further, the polyimides reported in this invention range from extremely soluble to insoluble. Methods of preparing gas separation membranes are known in the art. The soluble polyimides can be solution cast on porous solvent resistant substrates to serve as the dense separating layer of a composite membrane; or they can be solution cast as dense or asymmetric membranes. Insoluble examples can be cast into membranes from their polyamic acid form and subsequently chemically or thermally cyclized. The polymer may also be blended with a wide variety of other polymers. Such blends may be used to form gas separation membranes by methods well known in the art.

The polyimides described in this invention have high inherent thermal stabilities. The high temperature characteristics of these polyimides can help to prevent the membrane compaction problems observed in other polymers at even moderate temperatures.

The inventive polyimides may be formed into membranes having a variety of configurations, including hollow-fiber membranes. The configuration of the membrane is not limiting. For hollow-fiber membranes, the gas mixture to be separated may be introduced to the bore side or the so-called shell side of the membrane. It is usually preferable to introduce the gas to be separated to the bore side of the hollow-fiber membrane.

The polyimide membranes disclosed herein have found use in gas separations. The invention as described herein is useful for the separation of, for example, oxygen from nitrogen or air; hydrogen from at least one of carbon monoxide, carbon dioxide, helium, nitrogen, oxygen, argon, hydrogen sulfide, nitrous oxide, ammonia, and hydrocarbon of 1 to about 5 carbon atoms, especially methane, ethane and ethylene; ammonia from at least one of hydrogen, nitrogen, argon, and hydrocarbon of 1 to about 5 carbon atoms; e.g., methane; carbon dioxide from at least one of carbon monoxide and hydrocarbon of 1 to about 5 carbon atoms; e.g., methane; hydrogen sulfide from hydrocarbon of 1 to about 5 carbon atoms; for instance, methane, ethane, or ethylene; and carbon monoxide from at least one of hydrogen, helium, nitrogen, and hydrocarbon of 1 to about 5 carbon atoms. It is emphasized that the invention may also be useful for liquid separations and is not restricted to these particular separation applications of gases nor the specific membranes in the examples. The present invention finds use in the enrichment of oxygen and nitrogen from air for increased combustion or inerting streams, respectively; in recovery of hydrogen in refinery and ammonia plants, separation of carbon monoxide from hydrogen in syngas systems; and separation of carbon dioxide or hydrogen sulfide from hydrocarbons.

EXAMPLES

Example 1

To a solution of 1,4-bis(4-aminophenoxy)benzene (14.6 g, 0.05 mole) in N-methylpyrrolidone (75 g) was added DTMCDA (13.2 g, 0.05 mole), under an inert atmosphere at room temperature. The resulting reaction solution was mixed overnight at room temperature. To the resulting viscous solution was added a solution of acetic anhydride (20.42 g, 0.20 mole) and triethylamine (20.24 g, 0.20 mole) in N-methylpyrrolidone (50 g). The resulting reaction solution was mixed overnight at room temperature and then was precipitated in water. The resulting solid was collected, washed twice with water, washed twice with methanol and then allowed to air dry overnight. The solid was further dried in a vacuum oven at 20 inches (0.51 m) mercury and 120° C. for 4 hours to yield 25.4 g of an off-white product.

Films of the polymer prepared above were cast from a 15% polymer solution (based on weight) in N-methylpyrrolidone onto a glass plate with DuPont TEFLON ® dry lubricant at 100° C.±2° C. with a 20-mil ($5.1 \times 10^{-4}$ m) knife gap. (DuPont TEFLON ® dry lubricant contains a fluorocarbon telomer which reduces the adhesion of the membrane to the glass plate.) After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches, 0.51 mm mercury at 120° C. for 4 hours. The films were tough and flexible and could be creased without cracking.

A film, prepared as above which was 2.0 mils ($5.1 \times 10^{-5}$ m) thick, was tested for mixed gas oxygen/nitrogen (21/79, mole) permeabilities at 118.2 psig (815 KPag), 23.6° C. The results are reported below:
$O_2$ Productivity: 30 centiBarrers
$O_2$/N Selectivity: 6.2

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds times the partial pressure difference across the membrane in cm Hg; i.e., $$\text{centiBarrer} = 10^{-12} \times \frac{cm^3 \text{ (STP) cm}}{cm^2 \text{ sec cm Hg}}$$

Example 2

To a solution of 2,2-bis[4-(aminophenoxy)phenyl]propane (20.5 g, 0.05 mole) in N-methylpyrrolidone (75 g) was added DTMCDA (13.2 g, 0.05 mole), under an inert atmosphere at room temperature. After mixing overnight at room temperature, a solution of acetic anhydride (20.42 g, 0.20 mole) and triethylamine (20.24 g, 0.20 mole) in N-methylpyrrolidone (50 g) was added. The resulting reaction solution was mixed overnight at room temperature and then precipitated in water. The resulting solid was collected, washed twice with water, washed twice with methanol and then allowed to air dry overnight. The solid was further dried in a vacuum oven at 20 inches (0.51 m) mercury and 120° C. for 4 hours to yield 31.3 g of an off-white product.

Films of the polymer prepared above were cast from a 15% polymer solution (based on weight) in N-methylpyrrolidone onto a glass plate with TEFLON ® dry lubricant at 100° C.±2° C. with a 20-mil ($5.1 \times 10^{-4}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches, (0.51 m) mercury and 120° C. for 4 hours. The films were tough and flexible and could be creased without cracking.

A film, prepared as above which was 1.55 mils ($3.9 \times 10^{-5}$ m) thick, was tested for mixed gas oxygen/nitrogen (21/79, mole) permeabilities at 115.3 psig (795 KPag), 22.5° C. The results are reported below:
$O_2$ Productivity: 94 centiBarrers
$O_2$/$N_2$ Selectivity: 6.3

Example 3

To a solution of 4,4'-[1,4-phenylenebis(1-methylethylidene)]bisaniline (17.2 g, 0.05 mole) in N-methylpyrrolidone (75 g) was added DTMCDA (13.2 g, 0.05 mole), under an inert atmosphere at room temperature. After mixing overnight at room temperature, a solution of acetic anhydride (20.42 g, 0.20 mole) and triethylamine (20.24 g, 0.20 mole) in N-methylpyrrolidone (50 g) was added. The resulting reaction solution was mixed overnight at room temperature. The reaction solution was then precipitated in water. The resulting solid was collected, washed twice with water, washed twice with methanol and then allowed to air dry overnight. The solid was further dried in a vacuum oven at 20 inches (0.51 m) mercury and 120° C. for 4 hours to yield 25.3 g of an off-white product.

Films of the polymer prepared above were cast from a 15% polymer solution (based on weight) in N-methylpyrrolidone onto a glass plate with TEFLON ® dry lubricant at 100° C.±2° C. with a 20-mil ($5.1 \times 10^{-4}$ m) knife gap. After drying on the plate at 100° C.±2° C. for 0.5 hour, the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 2.25 mils ($5.7 \times 10^{-5}$ m) thick, was tested for mixed gas oxygen/nitrogen (21/79, mole) permeabilities at 115.9 psig (799 KPag) 22.6° C. The results are reported below:
$O_2$ Productivity: 110 centiBarrers
$O_2$/$N_2$ Selectivity: 5.2

Example 4

To a stirred solution of 4,4'-methylenebis(2,6-diisopropylaniline) (36.66 g, 0.10 mole)and 1,4-bis(4-aminophenoxy)biphenyl (18.64 g, 0.05 mole) in N methylpyrrolidone (400 ml) was added 3,3',4,4'-benzophenonetetracarboxylic acid dianhydride (36.61 g, 0.114 mole) and DTMCDA (10.00 g, 0.038 mole) under an inert atmosphere at room temperature. The resulting reaction solution was stirred overnight at room temperature. To the resulting very viscous reaction solution was added a solution of acetic anhydride (61.25 g, 0.60 mole) and triethylamine (60.71 g, 0.60 mole) in N-methylpyrrolidone (200 ml). After the resulting reaction solution had stirred at room temperature for 5 hours, the reaction solution was diluted with additional N-methylpyrrolidone and precipitated in water. The resulting solid was collected, washed twice with water, washed twice with methanol, and allowed to air dry overnight. The solid was further dried in a vacuum oven at 20 inches (0.51 m) mercury and 125° C. for 8 hours to yield 97.5 g product.

The polyimide prepared above was found to be soluble in methylene dichloride, m-cresol, dimethylsulfoxide, N,N-dimethyl acetamide and N-methylpyrrolidone.

Films of the polymer prepared above were cast from a 15% polymer solution (based on weight) in N-methylpyrrolidone onto a glass plate with TEFLON® dry lubricant at 100° C.±2° C. with a 20-mil (5.1×10$^{-4}$ m) knife gap. After drying on the plate at 100° C.±2° C. for 0.5 hour, the films were further dried in a vacuum oven at 20 inches mercury (0.51 m) and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.95 mils (4.95×10$^{-5}$ m) thick, was tested for mixed gas oxygen/nitrogen (21/79, mole) permeabilities at 115.9 psig (798 KPag), 23.1° C. The results are reported below:
O$_2$Productivity: 490 centiBarrers
O$_2$/N$_2$ Selectivity: 4.5

Example 5

To a solution of 1,4-bis(4-aminophenoxy)biphenyl (18.64 g, 0.05 mole) in N-methylpyrrolidone (75 g) was added DTMCDA (13.2 g, 0.05 mole) under an inert atmosphere at room temperature. The reaction solution was mixed overnight at room temperature. To the resulting very viscous reaction solution was added a solution of acetic anhydride (20.42 g, 0.20 mole) and triethylamine (20.24 g, 0.20 mole). The resulting reaction solution was mixed overnight at room temperature. The reaction solution was precipitated in water. The resulting solid was collected, washed twice with water, washed twice with methanol and allowed to air dry overnight. The solid was further dried in a vacuum oven at 20 inches (0.51 m) mercury and 120° C. for 4 hours to yield 21.8 g of an off-white product.

Films of the polymer prepared above were cast from a 15% polymer solution (based on weight) in N-methylpyrrolidone onto a glass plate with TEFLON® dry lubricant at 100° C.±2° C. with a 20-mil (5.1×10$^{-4}$ m) knife gap. After drying on the plate at 100° C.±2° C. for 0.5 hour the films were further dried in a vacuum oven at 20 inches (0.51 m) mercury and room temperature overnight. The films were stripped off the plate and dried in a vacuum oven at 20 inches (0.51 m) mercury and 120° C. for 4 hours. The films were tough and flexible and could be creased without cracking.

A film, prepared as above which was 1.85 mils (4.7×10$^{-5}$ m) thick, was tested for mixed gas oxygen/nitrogen (21/79, mole) permeabilities at 115.1 psig (783 KPag), 24.4° C. The results are reported below:
O$_2$ Productivity: 71 centiBarrers
O$_2$/N$_2$ Selectivity: 6.3

I claim:

1. A gas separation membrane formed from a polyimide comprising at least one of the following repeating units:

2. The gas separation membrane of claim 1 in which the remainder of repeating units are derived from aromatic dianhydrides, aliphatic dianhydrides and aromatic diamines.

3. The gas separation membrane of claim 1 wherein the polyimide used to form the membrane comprises the following repeating units:

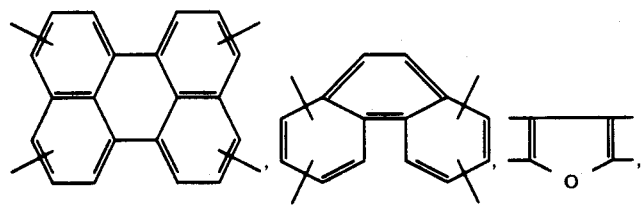
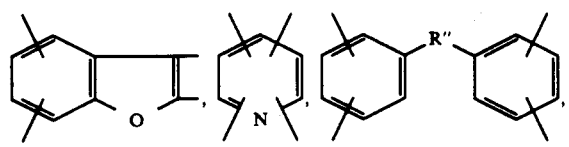
or mixtures thereof; where —R″— is an alkylene chain having 1-3 carbon atoms,
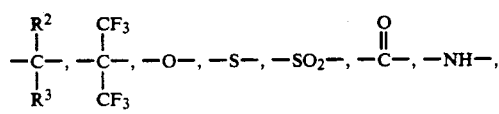
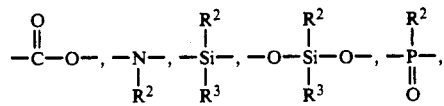
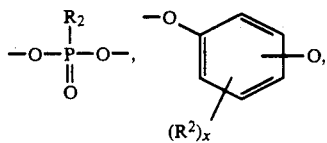
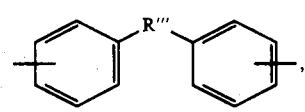
or mixtures thereof; where $R^2$ and $R^3$ are independently alkyl or aryl groups and x is an integer from 0 to 4; and —R‴ is
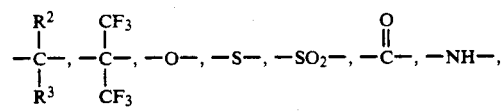
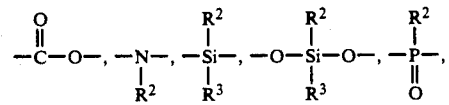
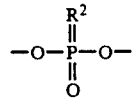
or mixtures thereof; —R— and —R′— are independently
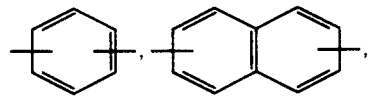
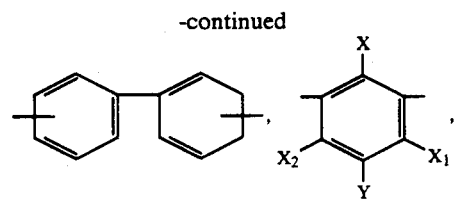
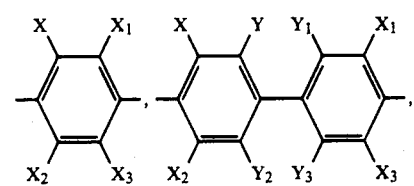
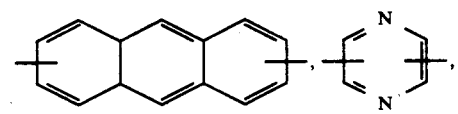
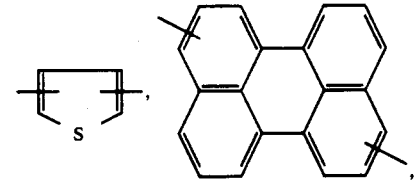
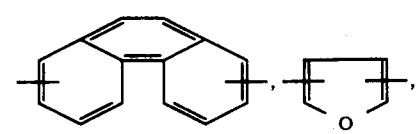
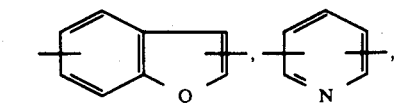
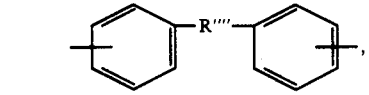

-continued

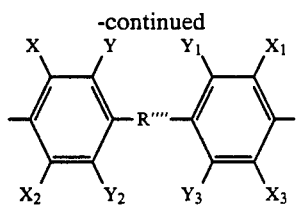

or mixtures thereof; where R'''' is

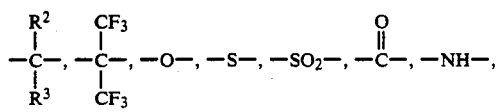

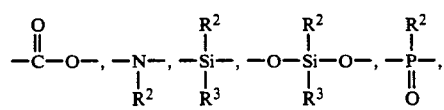

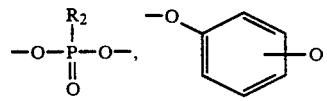

or mixtures thereof; $R^2$ and $R^3$ have the meanings defined above; —X, —$X_1$, —$X_2$ and —$X_3$ independently are alkyl groups containing 1 to 6 carbon atoms, and —Y, —$Y_1$, —$Y_2$ and —$Y_3$ independently are —X or —H.

4. The gas separation membrane of claim 3 wherein n is at least 25 mole percent.

5. The gas separation membrane of claim 4 wherein n is at least 50 mole percent.

6. The gas separation membrane of claim 5 wherein —R— and —$R^1$— are independently

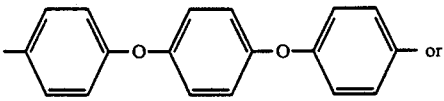

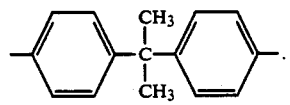

7. The gas separation membrane of claim 3 where m is 0.

8. The gas separation membrane of claim 1 in which the polymer has an inherent viscosity of at least 0.1 as measured at 30° C. on an 0.5 weight percent solution in concentrated sulfuric acid.

9. The gas separation membrane of claim 8 where

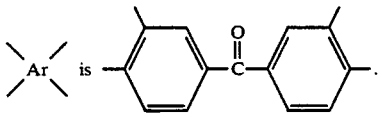

10. A process for separating gases comprising bringing a mixture of gases into contact with the first side of a separation membrane of claim 1 in a manner to cause a portion of the mixture to pass through the membrane to a permeate side, the resulting gas mixture on the permeate side being enriched in one or more component over that of the mixture on the first side.

* * * * *

UNITED STATES PATENT AND TRADEMARK OFFICE
CERTIFICATE OF CORRECTION

PATENT NO. : 5,322,549
DATED : June 21, 1994
INVENTOR(S) : Richard Allen Hayes It is certified that error appears in the above-identified patent and that said Letters Patent is hereby corrected as shown below:

On the title page,
  Item [73] Assignee, please add -- and L'Air Liquide, S.A., Paris, France --

Signed and Sealed this

Eighth Day of November, 1994

*Attest:*

BRUCE LEHMAN

*Attesting Officer*    *Commissioner of Patents and Trademarks*